United States Patent [19]

Filipelli

[11] Patent Number: 5,020,943
[45] Date of Patent: Jun. 4, 1991

[54] PIPE FOR THE PNEUMATIC TRANSPORT OF POLYMER PARTICLES

[75] Inventor: Michel C. H. Filipelli, London, England

[73] Assignee: BP Chemicals Limited, London, England

[21] Appl. No.: 450,869

[22] Filed: Dec. 18, 1989

[30] Foreign Application Priority Data

Dec. 30, 1988 [FR] France .................. 88 17593

[51] Int. Cl.[5] .............................................. B65G 51/18
[52] U.S. Cl. ................................... 406/195; 406/191; 138/44; 138/37
[58] Field of Search ............... 406/191, 193, 195, 197; 138/37, 39, 44, 40, 121, 173, 177, 119, 43, 45

[56] References Cited

U.S. PATENT DOCUMENTS

| | | | |
|---|---|---|---|
| 3,380,783 | 4/1968 | Hunter | 302/64 |
| 3,524,478 | 6/1967 | Rapp et al. | 406/191 |
| 3,721,269 | 3/1973 | Choate et al. | 138/119 |
| 4,230,426 | 10/1980 | Avery, Jr. et al. | 406/191 |

FOREIGN PATENT DOCUMENTS

| | | |
|---|---|---|
| 587171 | 4/1977 | Fed. Rep. of Germany . |
| 87173670 | 11/1988 | Fed. Rep. of Germany . |
| 1460405 | 10/1966 | France . |
| 2069317 | 9/1971 | France . |
| 1164370 | 9/1969 | United Kingdom . |
| 2213792A | 8/1989 | United Kingdom ............... 406/191 |

Primary Examiner—Joseph F. Peters, Jr.
Assistant Examiner—Christopher P. Ellis
Attorney, Agent, or Firm—Nixon & Vanderhye

[57] ABSTRACT

A cylindrical pipe of internal diameter d, intended for pneumatic transport of solid polymer particles. The pipe has contrictions located over its length in such a way that the distance l between two consecutive constrictions is between d and 10×d. Each constriction consists of a non-uniform restriction of the cross-sectional area S of the pipe. That restriction defines a new internal cross-sectional area S' of between 0.900×S and 0.995×S and has at least one unrestricted free passage defined by a circular sector of the area S with a vertex situated on the axis of the pipe and an angle at the vertex ranging from 5° to 60°.

5 Claims, 1 Drawing Sheet

PIPE FOR THE PNEUMATIC TRANSPORT OF POLYMER PARTICLES

The present invention relates to a novel pipe suitable for the pneumatic transport of polymer particles and to a pneumatic transport process.

BACKGROUND OF THE INVENTION

In plants for the manufacture of polymer and/or the conversion of polymer to granules or finished articles, it is known to transport polymer particles, such as powders, beads or granules, pneumatically. These polymer particles are transported with the aid of a carrier gas in a pipeline consisting of a system of pipes characterized by a constant cross-section and more particularly by a circular section of constant diameter. However, during transport of the polymer, the formation of threads or filaments, disturbing the transport and the conversion of this polymer, is observed inside the pipelines. The formation of threads or filaments is essentially due to degradation or crumbling of the polymer particles. This degradation or crumbling takes place when the particles rub against one another or against the walls of the pipelines, with incipient melting of the polymer, especially in zones where the flow can be of the laminar type. These phenomena are generally observed when hot polymer particles are transported or when the particles are transported with the aid of a hot carrier gas.

To minimize the degradation or crumbling of the polymer particles during their transport, it has already been proposed to use pipes having a rough internal surface or having notches formed in their inner wall. In particular, the pipes can have, on their internal surface, circular or helical notches which can be made with the aid of a special device moving inside these pipes. It is thus impossible to produce such pipes in an already existing plant. Furthermore, during transport of the polymer, the notches can fill with polymer particles and can therefore lose their effect on the transport of the particles. In addition, the polymer transported in such pipes can be contaminated by another polymer, of a different quality, which has previously been transported in these pipes.

SUMMARY OF THE INVENTION

A novel pipe for the pneumatic transport of solid polymer particles has now been found which makes it possible to overcome the disadvantages mentioned above. In particular, when used, it avoids the formation of polymer threads or filaments, especially when it is used to transport a hot polymer or to transport a polymer by means of a hot carrier gas. This novel pipe has the attraction of being easy to produce with the aid of a simple device. The invention has the added attraction that pipes of an already existing plant can be easily modified to form pipes according to the invention.

The present invention therefore relates to a cylindrical pipe of internal diameter d, intended for the pneumatic transport of solid polymer particles, characterized in that it has constrictions located over its length in such a way that the distance l between two consecutive constrictions is between d and $10 \times d$.

DETAILED DESCRIPTION OF THE INVENTION

According to the present invention, it is essential for the distance l between two consecutive constrictions to be short enough to avoid the formation of threads or filaments. When a cylindrical pipe has an internal diameter d, the distance l is generally between d and $10 \times d$ and preferably between $1.5 \times d$ and $5 \times d$. Advantageously, the constrictions are located at regular intervals over the length of the pipe and are a constant distance l apart.

Figure 1:
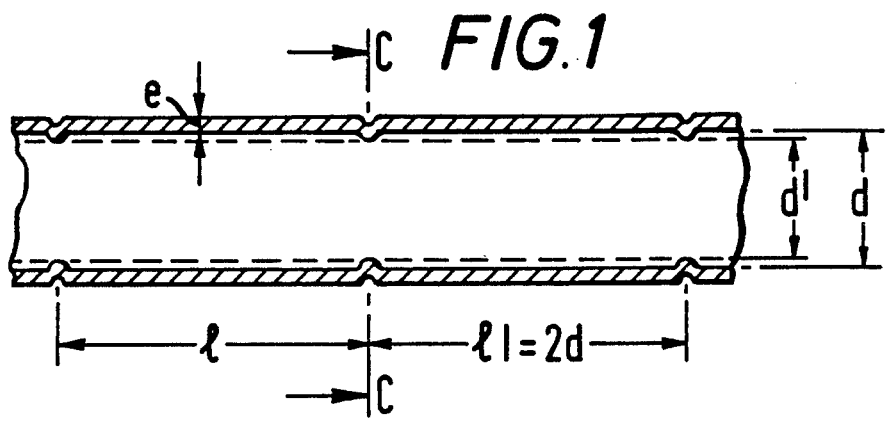
FIG. 1 schematically represents a longitudinal section of a pipe with constrictions.

FIG. 1 schematically represents a longitudinal section of a cylindrical pipe according to the present invention, the said pipe having a thickness e and an internal diameter d and having constrictions located at regular intervals and a distance l apart, l being equal to $2 \times d$.

According to the present invention, a constriction consists of a restriction of the internal circular cross-sectional area S of the pipe. At each constriction, the new internal cross-sectional area S' of the pipe, which is useful for the passage of the polymer, can advantageously be between $0.900 \times S$ and $0.995 \times S$ and more particularly between $0.95 \times S$ and $0.99 \times S$.

Preferably, a constriction is produced symmetrically to the longitudinal axis of the cylindrical pipe. The appearance of mechanical stresses, which may cause the pipe to deform, can thus be avoided when the pipe is made. Consequently, at each constriction of this type, an internal cross-sectional area S' is obtained which is symmetrical relative to the longitudinal axis of the pipe.

A constriction in the cylindrical pipe can consist in particular of a symmetrical and uniform restriction of the circular cross-sectional area S so as to give a new circular cross-sectional area S' concentric with the area S. This type of constriction is particularly suitable for a pipe arranged vertically in a plant for the pneumatic transport of polymer.

Figures 3, 4:
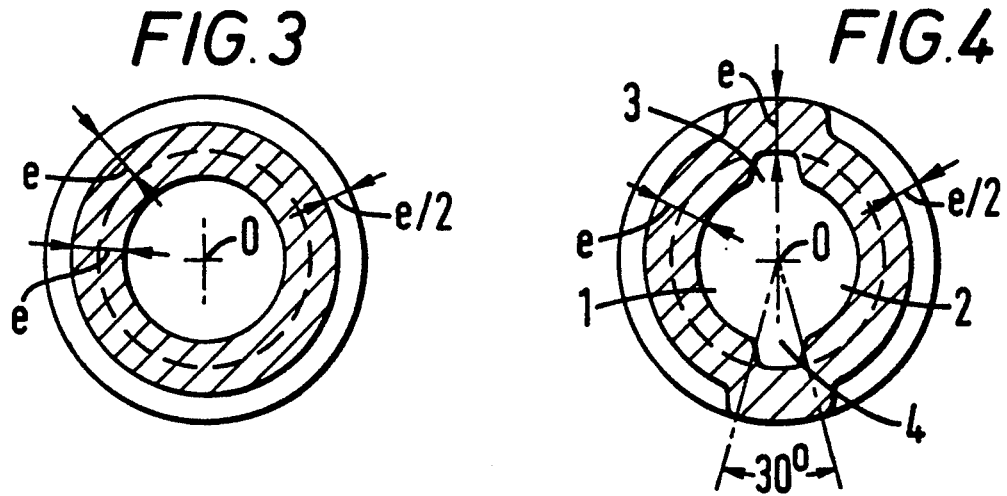
FIGS. 3 and 4 schematically represent two different types of constriction in a cross-section CC of the pipe shown in FIG. 1.

FIG. 3 schematically represents a constriction consisting of a symmetrical and uniform restriction, in a cross-section of a pipe having a thickness e and an internal diameter d. This constriction defines a circular cross-sectional area S' of diameter d'.

The constriction in the cylindrical pipe can also consist of a non-uniform restriction of the circular area S. In particular, it can be produced so as to give a surface S' having a restricted part and one or more unrestricted free passages defined by circular sectors of the area S. The circular sectors have a vertex situated on the axis of the pipe and an angle at the vertex ranging from 5° to 60°. This type of constriction having at least one unrestricted passage is suitable for any pipe of a plant for the pneumatic transport of polymer. However, this type of constriction is particularly recommended for a horizontal or inclined pipe such that the axis of the pipe forms an angle of less than about 80° with the horizontal plane. In such a pipe, an unrestricted free passage is advantageously located at the lowest point of each constriction. The effect of the restricted part is to stop or slow down the particles, which then tend to fall under gravity to the lowest point of the constriction. The unrestricted free passage enables the latter particles to be picked up again in the flowing gas.

FIG. 4 schematically represents a non-uniform constriction in a cylindrical pipe having a thickness e and an internal diameter d. This constriction defines a surface S having:

- a restricted zone defined by two circular sectors (1) and (2), which are symmetrical relative to their vertex 0 and each have an angle at the vertex of 150° and a radius d/2, and
- an unrestricted zone bounded by two circular sectors (3) and (4) leaving a free passage at the highest and lowest points of the constriction, respectively, these sectors being symmetrical relative to their vertex 0 and each having an angle at the vertex of 30° and a radius d/2.

The pipe for pneumatic transport according to the invention can be made of a light metal such as aluminum, an alloy of a light metal, steel or stainless steel. This pipe has an internal diameter d chosen according to the amount of polymer to be transported. The diameter d is generally between 5 and 30 cm and preferably between 18 and 25 cm. This pipe has a wall of thickness e, which can be 1 to 5 mm and preferably 2 to 3 mm.

Figure 2:
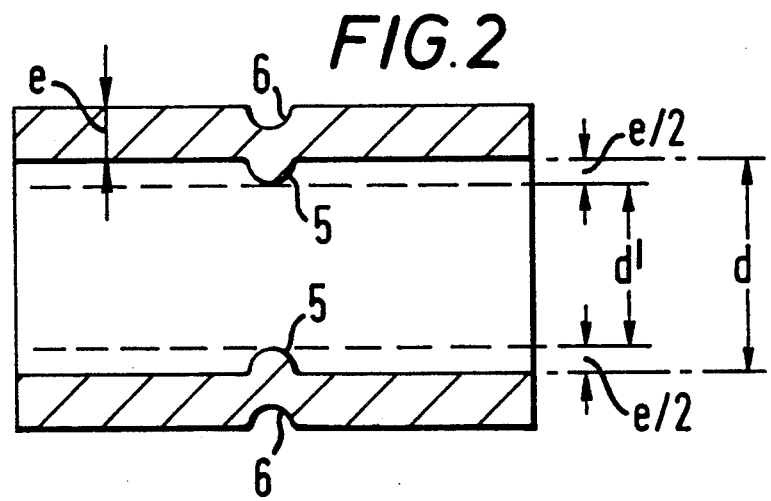
FIG. 2 schematically represents a constriction in a longitudinal section of the pipe.

The constrictions in the pipe advantageously have an internal surface which does not have any angular parts. By way of example, FIG. 2 schematically represents a constriction in a longitudinal section of a pipe of thickness e, such as shown in FIG. 1. This constriction corresponds to a circular depression in the pipe, which deforms its internal and external surfaces into the shape of two semicircles (5) and (6) of radius e/2, its thickness e being left unchanged.

The constrictions can be produced simply by means of pressure exerted externally on the external surface of the wall of the pipe. Depending on the type of constriction to be produced, the pressure can be exerted over all or part of the periphery of the cross-section. The constrictions are produced by means of any known process which makes it possible to reduce the diameter of a tube, in particular by hammering, or by a restriction process using an apparatus equipped with a wheel actuated by a lever.

The invention further relates to a process for the pneumatic transport of solid polymer particles by means of pipes according to the invention. This process is characterized in that the polymer particles are transported with the aid of a carrier gas at a gauge pressure of between 10 and 100 kPa, a temperature which is at least 5° C. below the melting point of the polymer and a sufficient velocity to ensure turbulent flow of the mixture consisting of the carrier gas and the particles.

The carrier gas can be air, nitrogen or a mixture of gases which may contain monomers, saturated or unsaturated hydrocarbons, water vapour, hydrogen, nitrogen or oxygen. The carrier gas can circulate at a velocity of between 10 m/s and 40 m/s in a pipe having an internal diameter d of between 5 and 30 cm.

The use of the pipe of the present invention in a plant for the pneumatic transport of polymer makes it possible to avoid the formation of threads or filaments and has the advantage of favouring flows of the turbulent type. Furthermore, it is found, surprisingly, that the amount of polymer transported for a given amount of carrier gas is increased by 10 to 20% when using this pipe.

The polymer is generally in the form of a powder consisting of particles with a mean diameter ranging from 200 to 2000 microns or, advantageously, in the form of beads or granules with a mean diameter ranging from 2 to 4 mm. When the polymer circulates in a pipe according to the present invention, the temperature of the polymer can be at least 5° C. below its melting point.

The pipe according to the invention can be used in pipelines for transporting a wide variety of polymers in particular polyester, polystyrene, polyvinyl chloride and polyolefins such as polypropylene, high or low density polyethylene, linear low density polyethylene and copolymsrs of ethylene or propylene. These polymers can contain additives, especially cling agents such as polybutene or atactic polypropylene. The pipe of the invention is suitable for transporting granules of low density or linear low density polyethylene, granules of copolymers of the EPR or EPDM type and, more particularly, granules of polyethylene having a melt index greater than or equal to 0.5 g/10 minutes, measured at 190° C. under a load of 2.16 kg.

The following Example illustrates the present invention.

EXAMPLE

Granules of an ethylene/but-1-ene copolymer, having a density of 0.918, a melt index of 1 g/10 minutes, measured at 190° C. under a load of 2.16 kg, and a melting point of the order of 110° C. to 123° C., are transported pneumatically in a plant for the manufacture of linear low density polyethylene, comprising in particular a polymerization reactor and an extruder for granulating the polymer produced. These granules have a mean diameter of 3 mm and are at a temperature of about 60° C. They are transported pneumatically in a pipeline with the aid of air at 20° C., a relative pressure of 40 kPa and a velocity which varies from 15 m/s to 25 m/s between the beginning and end of the pipeline.

The pipeline consists of a system of cylindrical aluminium pipes represented schematically in FIGS. 1, 2, 3 and 4. The pipes have a thickness e of 2.5 mm and an internal diameter d of 250 mm. The cross-section of a pips therefore has a circular cross-sectional area S', which is useful for the passage of the granules, of 491 cm$^2$. The pipes possess constrictions which are regularly spaced out and are a distance 1 of 500 mm apart.

When this pipe is arranged vertically in the plant, each constriction, such as shown in FIG. 3, consists of a uniform restriction of the cross-sectional area S of the internal cross-section of the pipe. It is produced in such a way that the new cross-section of the pipe has a diameter d of 247.5 mm and hence an area S', which is useful for the passage of the granules, of 481 cm$^2$.

When this pipe is not arranged vertically, each constriction, such as shown in FIG. 4, consists of a non-uniform restriction of the surface S' of the internal cross-section of the pipe. It is produced in such a way that the new cross-section of the pipe has:

- a restricted zone bounded by two circular sectors (1) and (2), each of which has an angle at the vertex of 150° and a radius of 124 mm, and
- an unrestricted zone bounded by two circular sectors (3) and (4), each of which has an angle at the vertex of 30° and a radius of 125 mm.

Thus, the new cross-section of the pipe has an area S' of 482.5 cm$^2$.

Under these conditions, no formation of polymer thread or filament is observed when the granules are transported pneumatically in this pipeline.

I claim:

1. A cylindrical pipe of internal diameter d and cross-sectional area S, intended for pneumatic transport of solid polymer particles, said pipe comprising constructions located over its length in such a way that the distance 1 between two consecutive constrictions is between d and 10×d, each constriction consisting of an non-uniform restriction of the cross-sectional area S of the pipe, said non-uniform restriction defining a new internal cross-sectional area S' of between 0.009×S and 0.995×S and having at least one unrestricted free passage defined by a circular sector of the area S with a vertex situated on the axis of the pipe and an angle at the vertex ranging from 5° to 60°.

2. The pipe according to claim 1, wherein said new internal cross-sectional area S' is between 0.95×S and 0.99×S.

3. The pipe according to claim 1, wherein a constriction consists of a restriction of the internal cross-sectional area of the pipe, said restriction being symmetrical relative to the axis of the pipe.

4. The pipe according to claim 1, wherein the unrestricted free passage is located at the lowest point of the restriction.

5. The pipe according to claim 1, wherein the constriction consists of the non-uniform restrictions defined by two circular sectors each having an identical vertex situated on the axis of the pipe, the said two circular sectors being separated by two unrestricted free passages defined by two circular sectors each having the said vertex and leaving free passages at the highest and lowest points of the constriction.

* * * * *